United States Patent
Iwata et al.

(10) Patent No.: US 11,337,411 B2
(45) Date of Patent: May 24, 2022

(54) FISHING ROD (71) Applicant: Shimano Inc., Osaka (JP)

(72) Inventors: Soshi Iwata, Osaka (JP); Yuki Tokuyama, Osaka (JP)

(73) Assignee: Shimano Inc., Osaka (JP)

( * ) Notice: Subject to any disclaimer, the term of this patent is extended or adjusted under 35 U.S.C. 154(b) by 120 days.

(21) Appl. No.: 16/839,979

(22) Filed: Apr. 3, 2020

(65) Prior Publication Data

US 2020/0383305 A1 Dec. 10, 2020

(30) Foreign Application Priority Data

Jun. 4, 2019 (JP) .............................. JP2019-104393

(51) Int. Cl.
*A01K 87/00* (2006.01)
*A01K 87/02* (2006.01)

(52) U.S. Cl.
CPC .............. *A01K 87/00* (2013.01); *A01K 87/02* (2013.01)

(58) Field of Classification Search
CPC ................................ A01K 87/00; A01K 87/02
USPC ............................................... 43/18.1 R, 18.5
See application file for complete search history.

(56) References Cited

U.S. PATENT DOCUMENTS

| | | | | |
|---|---|---|---|---|
| 3,260,010 A | * | 7/1966 | Dubois .................. | A01K 87/00 273/DIG. 7 |
| 4,043,074 A | * | 8/1977 | Airhart .................. | A01K 87/00 43/18.5 |
| 4,355,061 A | * | 10/1982 | Zeigler .................. | A01K 87/00 156/173 |
| 4,362,418 A | * | 12/1982 | Loomis .................. | A01K 87/02 403/293 |
| 4,601,127 A | * | 7/1986 | Maeda .................... | A01K 87/08 43/18.5 |
| 4,860,481 A | * | 8/1989 | Christenson ........... | A01K 87/00 156/190 |
| 4,885,865 A | * | 12/1989 | Rumbaugh ............. | A01K 87/00 43/18.5 |
| 5,317,828 A | * | 6/1994 | Yasui ...................... | A01K 87/00 156/190 |
| 5,421,573 A | * | 6/1995 | Kawamatsu ............ | A63B 53/10 473/319 |
| 5,926,992 A | * | 7/1999 | Tsurufuji ............. | A01K 87/002 43/24 |
| 6,354,957 B1 | * | 3/2002 | Saito ...................... | A63B 60/54 473/319 |

(Continued)

FOREIGN PATENT DOCUMENTS

| | | | | |
|---|---|---|---|---|
| EP | 826481 A2 | * | 3/1998 | ............. A01K 87/00 |
| JP | 2003009722 A | * | 1/2003 | ............. A01K 87/00 |

(Continued)

*Primary Examiner* — Darren W Ark
*Assistant Examiner* — Katelyn T Truong
(74) *Attorney, Agent, or Firm* — Global IP Counsels, LLP (57) ABSTRACT

A fishing rod includes a rod body. The rod body includes a plurality of strips, each of the plurality of strips includes a tip strip portion having a first narrowing section which gradually narrows in width towards the rod end side and an end strip portion having a second narrowing section which gradually narrows in width towards the rod tip side. At least a part of the first narrowing section and at least a part of the second narrowing section overlap with each other to form an overlapping portion.

5 Claims, 12 Drawing Sheets

(56) References Cited

U.S. PATENT DOCUMENTS

| | | | | |
|---|---|---|---|---|
| 6,524,195 | B1* | 2/2003 | Kusumoto | A63B 60/54 473/319 |
| 8,001,716 | B1* | 8/2011 | Lepage | A01K 87/00 43/18.5 |
| 8,424,236 | B2* | 4/2013 | Huang | A01K 87/08 43/18.1 R |
| 2005/0178040 | A1* | 8/2005 | Kato | A01K 87/00 43/18.1 R |
| 2005/0223617 | A1* | 10/2005 | Morita | A01K 87/00 43/18.5 |
| 2006/0185218 | A1* | 8/2006 | Whiting | A01K 87/00 43/18.5 |
| 2008/0229646 | A1* | 9/2008 | Huang | A01K 87/08 43/18.5 |
| 2012/0174467 | A1* | 7/2012 | Iwanari | A01K 87/00 43/18.1 R |
| 2014/0173967 | A1* | 6/2014 | Iwata | A01K 87/08 43/18.1 R |

FOREIGN PATENT DOCUMENTS

| | | | | |
|---|---|---|---|---|
| JP | 2018-7582 A | | 1/2018 | |
| WO | WO-2004064512 A1 * | | 8/2004 | A01K 87/00 |

* cited by examiner

FISHING ROD

CROSS-REFERENCE TO RELATED APPLICATIONS

This application claims priority to Japanese Patent Application No. 2019-104393, filed on Jun. 4, 2019. The entire disclosure of Japanese Patent Application No. 2019-104393 is hereby incorporated herein by reference.

BACKGROUND

Field of the Invention

The present invention relates to a fishing rod that includes a rod body.

Background Art

Conventional rod bodies can be manufactured from "pre-impregnated" composite fibers (prepreg) where a thermoset polymer matrix material, such as epoxy, or a thermoplastic resin is already present. In these conventional rods, the prepreg has a length over the entire length of the rod body, for example, and is wound on a mandrel more than once. In the configuration in which the prepreg is wound more than once in this manner, the shape and the strength of the rod body are likely to be restricted.

On the other hand, in Japanese Laid-Open Patent Application No. 2018-7582 described below, a layer which corresponds to the entire circumference of the rod body is formed by four separated pieces. According to this configuration, even when the diameter of the rod body significantly changes, it is easy to adapt to the change.

SUMMARY

It has been determined that a configuration is desired, in which the degree of freedom in design with respect to the shape and the strength of the rod body is further improved.

Thus, an object of the present invention is to improve the degree of freedom in design in with respect to the shape and the strength of a rod body.

The fishing rod according to the present invention includes a rod body. The rod body has a plurality of strips. A strip has a tip strip portion and an end strip portion. The tip strip portion has a first narrowing section. The first narrowing section gradually narrows towards the rod end side. The end strip portion has a second narrowing section. The second narrowing section gradually narrows towards the rod tip side. At least a part of the first narrowing section and at least a part of the second narrowing section are overlapping with each other.

Preferably, the width of the tip strip portion is narrower than the width of the end strip portion.

Preferably, the rod body has a small diameter part, a large diameter part and an expanding part. The small diameter part is composed of the tip strip portions. The large diameter part is composed of the end strip portions. The expanding part includes a portion where the first narrowing sections and the second narrowing sections overlap.

Preferably, the tip strip portion is composed of a first prepreg and the end strip portion is composed of a second prepreg which is different from the first prepreg.

Preferably, the tip strip portion and the end strip portion are both symmetric in the width direction and the center line of the tip strip portion in the width direction and the center line of the end strip portion in the width direction are disposed on the same line in the circumferential direction of the rod body.

As described above, with the fishing rod according to the present invention, it is possible to improve the degree of freedom of design in with respect to the shape and the strength of a rod body.

DETAILED DESCRIPTION OF EMBODIMENTS

Figure 1:
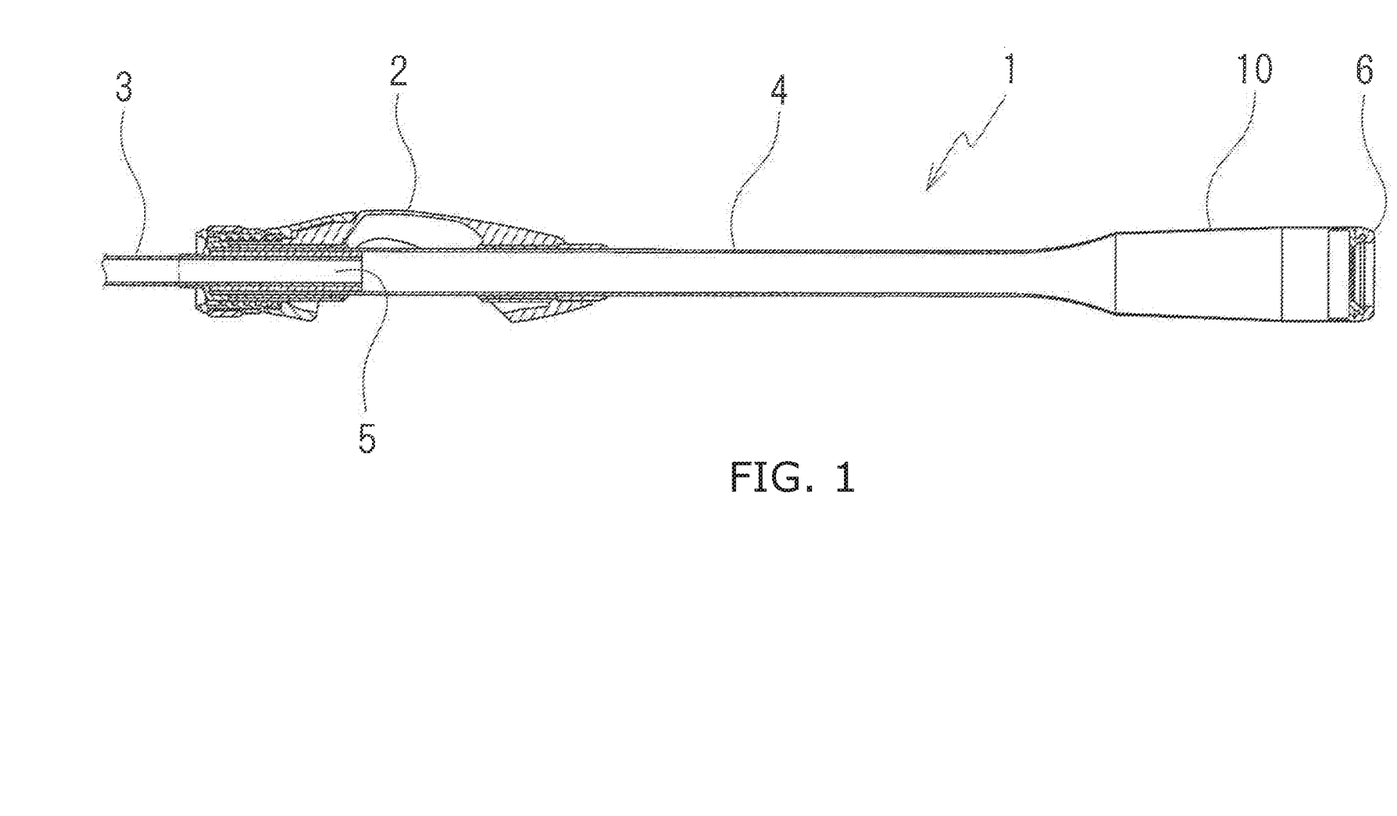
FIG. 1 is a vertical cross-sectional view showing the main section of a fishing rod in one embodiment of the present invention.

A fishing rod according to one embodiment of the present invention will be described below with reference to FIGS. 1 to 7B. The rod tip side is referred to as the front side and the rod end side is referred to as the rear side. As shown in FIG. 1, the fishing rod according to the embodiment has a reel seat 2 for attaching a reel (not shown). The reel seat 2 is a cylinder which is also referred to as a pipe seat. The reel seat 2 is externally mounted on a rod body 1 (blank) of the fishing rod and immovably fixed in a prescribed position. In one embodiment, the rod body 1 can be inserted into the reel seat 2, and the reel seat 2 can be fixed in a prescribed position on the outer periphery of the rod body 1 by adhering or the like. Note that the reel seat 2 according to one embodiment is for fixing a spinning reel. However, the reel seat 2 can be for fixing a dual-bearing reel.

In the illustrated embodiment, the rod body 1 and can be hollow or solid and can include a front part 3 and a rear side part 4. The rear part 4 is disposed on and joined to the rear portion of the front part 3. Furthermore, by having the rear part 4 overlap the outside of the front part 3, an overlapping portion 5 which has a prescribed length, can be formed. The rear portion of the front part 3 and the front portion of the rear part 4 are joined together. As show in FIG. 1, the front part 3 extends further to the front side of the rod body 1 than the reel seat 2, and the rear part 4 extends further to the rear side of the reel main body than the reel seat 2. An end cap 6 is placed on the rear end of the rear part 4.

The rear part 4 has a rear grip portion 10, which is integrally formed on the rear portion of the rear part 4. The rear grip portion 10 has a diameter along a prescribed length on the rear part 4 at the rear end side is that is greater than the remainder of the rear part 4. The rear grip portion 10 is spaced from the reel seat 2 towards the rear side of the reel main body. In one embodiment, the rear grip portion 10 is disposed on the aftermost portion of the rear part 4. An elbow or a lower part of the arm holding the fishing rod can be placed on the rear grip portion 10. Also, when casting with both hands, the rear grip portion 10 can be held with a hand opposite from the hand holding the reel seat 2.

The type of the fishing rod can be arbitrary, and it can be a connecting rod or a telescopic rod, or any other rod desired. For example, when the fishing rod is a one-piece rod, the front part 3 has a single rod structure that continues to the rod tip. When the fishing rod is a two-piece rod, the fishing rod is structured to have a first section rod on the rod tip side and a second section rod on the rod end side. The reel seat 2 is mounted on the second section rod. As can be understood, the second section rod is composed of the front part 3 and the rear part 4.

The front part 3 is hollow, however, it can be solid. For example, in one embodiment, the hollow front part 3 is formed by winding up prepreg on a mandrel 100 (see e.g., FIG. 4) and firing. In this embodiment, the reinforcement fiber of the prepreg is, for example, a carbon fiber or a glass fiber. In the present embodiment, the rear part 4 is hollow. However, rear part 4 can be solid.

Figure 2:
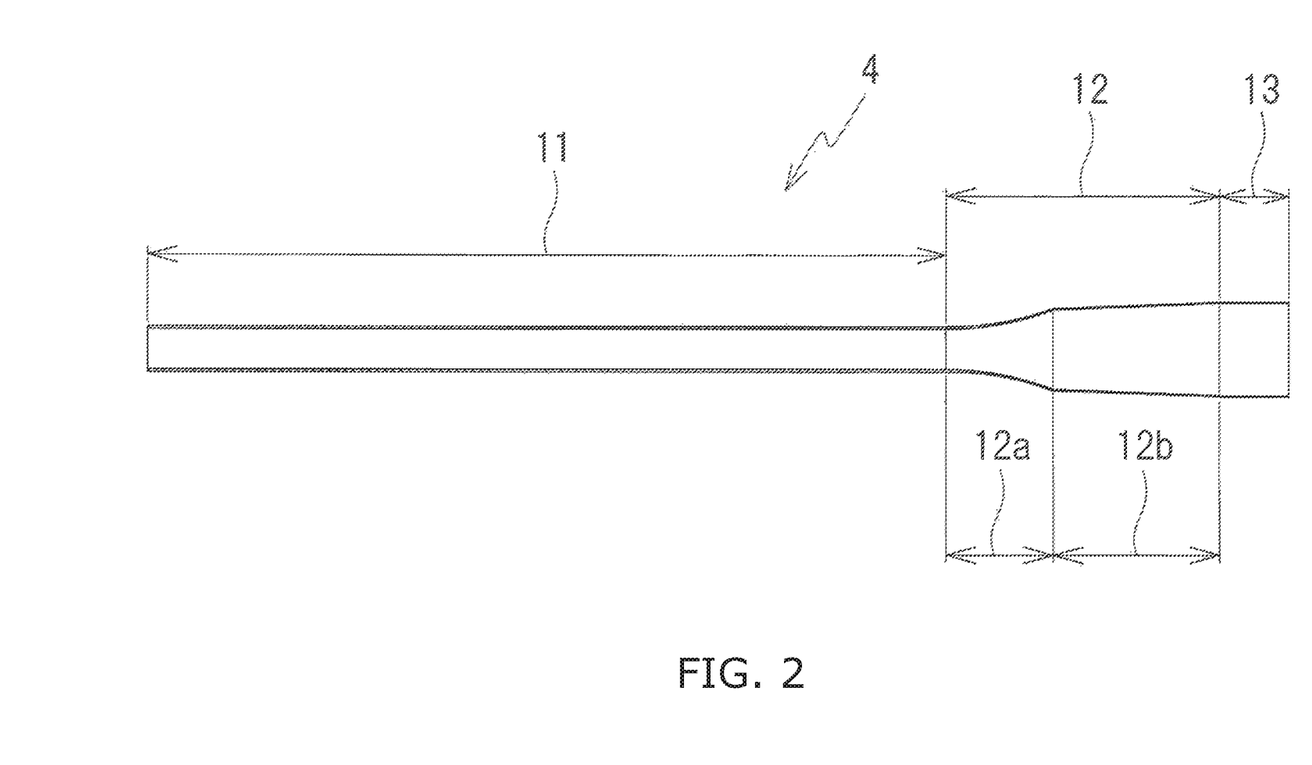
FIG. 2 is a vertical cross-sectional view showing a rod body of the fishing rod.

In FIG. 2, only the rear part 4 is shown. The rear part 4 has a small diameter part 11, an expanding part 12 which continues or extends from the rear side of the small diameter part 11, and a large diameter part 13 which continues extends from the rear side of the expanding part 12. The small diameter part 11 forms the front portion of the rear part 4. The expanding part 12 and the large diameter part 13 constitute the rear grip portion 10. The small diameter part 11 forms a prescribed length area which starts from the front end of the rear part 4. The length of the small diameter part 11 is more than half of the entire length of the rear part 4. Thus, the small diameter part 11 is the main part of the rear part 4, since the small diameter part 11 is longer than the rear grip portion 10. The small diameter part 11 is a straight portion with constant inner diameter. However, the small diameter part 11 can have a slope. The reel seat 2 is generally mounted on the small diameter part 11.

The expanding part 12 continues or extends from the rear side of the small diameter part 11. The expanding part 12 has an increasing diameter towards the rear side with a steeper slope than the slope of the small diameter part 11. The expanding part 12 is divided into front and rear areas. In particular, the steep expanding part 12 can be divided into a front portion 12a and a rear portion 12b. The f front portion 12a has a steeper slope than that of the rear portion 12b.

The large diameter part 13 continues or extends from the rear side of the expanding part 12 to the rear end of the rear part 4. The large diameter part 13 has a larger diameter than that of the small diameter part 11. The large diameter part 13 is a straight portion with constant inner diameter similar to the small diameter part 11. In one embodiment, the small diameter part 11 can be referred to as the front side straight portion and the large diameter part 13 can be referred to as the rear side straight portion. The length of the large diameter part 13 is shorter than the length of the expanding part 12, for example. The shape of the expanding part 12 can vary and does not have to be sectioned into front and rear portions.

Figure 3A:
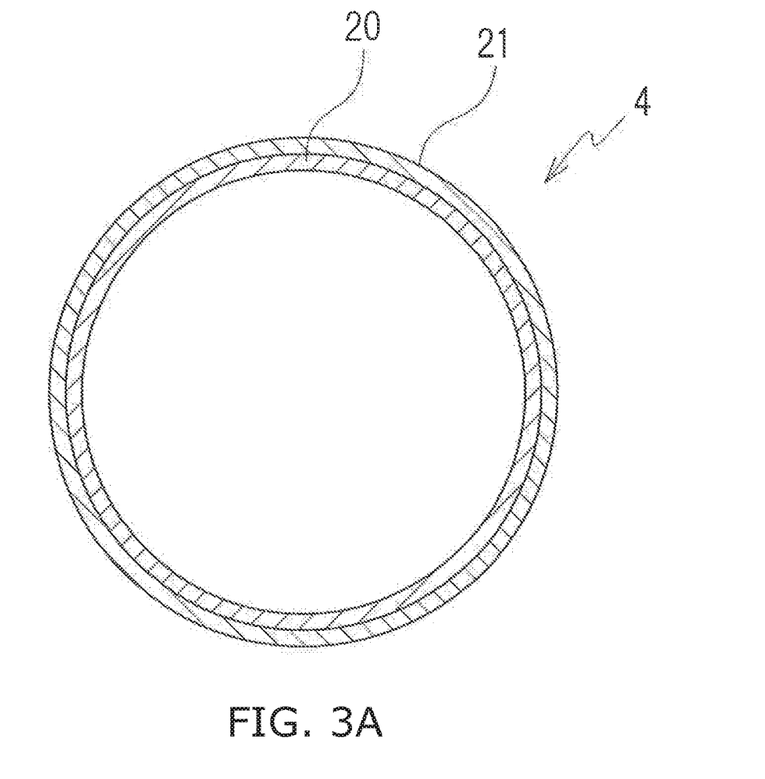
FIG. 3A is a cross-sectional view of the rod body.
Figure 3B:
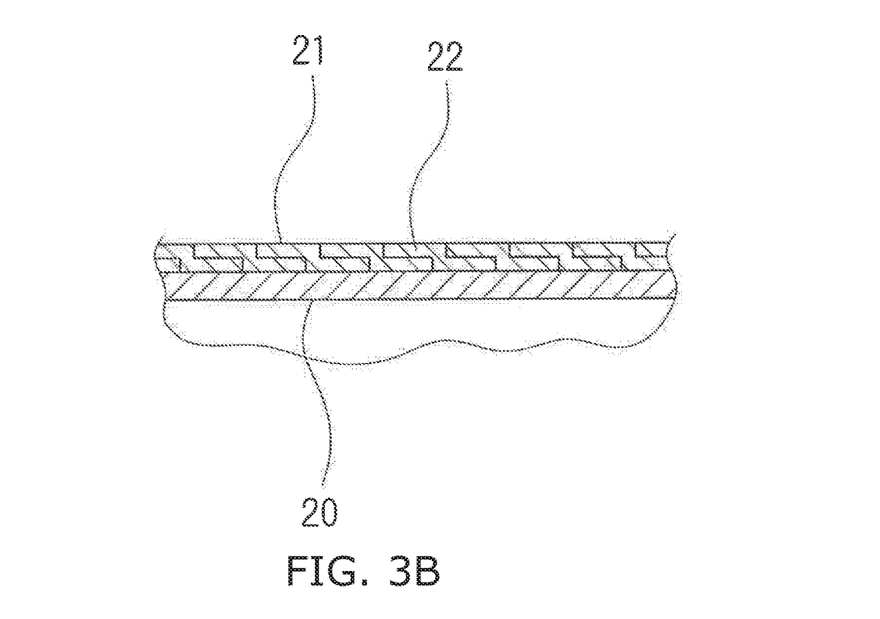
FIG. 3B is a vertical cross-sectional view of the main section of the rod body.

The layer structure of the rear part 4 will now be described. FIG. 3 illustrates one example of the layer structure of the rear part 4. In this embodiment, the rear part 4 has a cylindrical main layer 20 and a cylindrical sublayer 21 formed sequentially from the inside to the outside. The main layer 20 is formed over the entire length of the rear part 4, and can be a fiber reinforced resin layer which contains reinforcement fibers. The main layer 20 is formed by prepreg. The main layer 20 in the present embodiment forms the innermost layer of the rear part 4.

Main Layer 20

Figure 4:
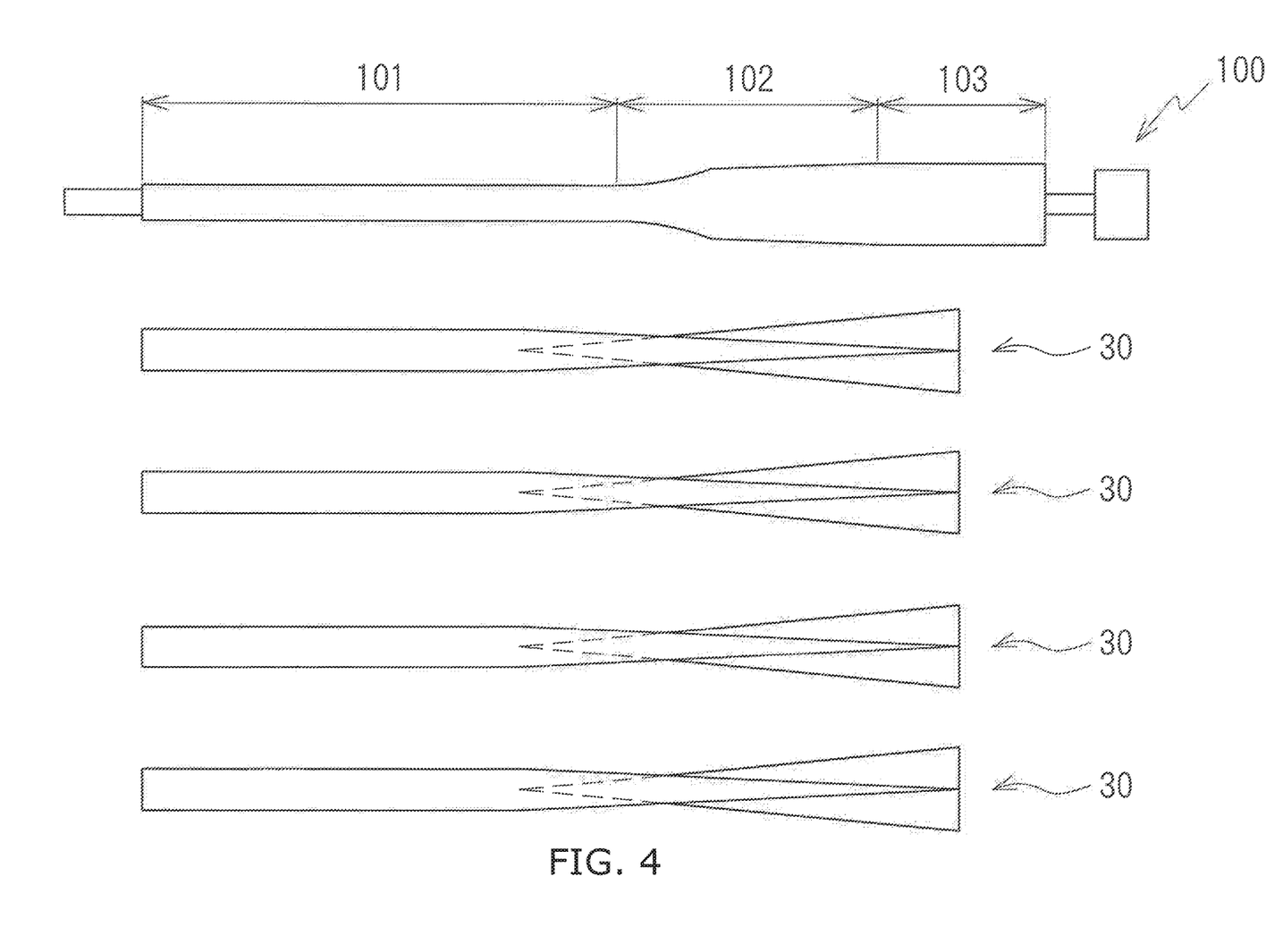
FIG. 4 illustrates the manufacturing process of the rod body.
Figure 6:
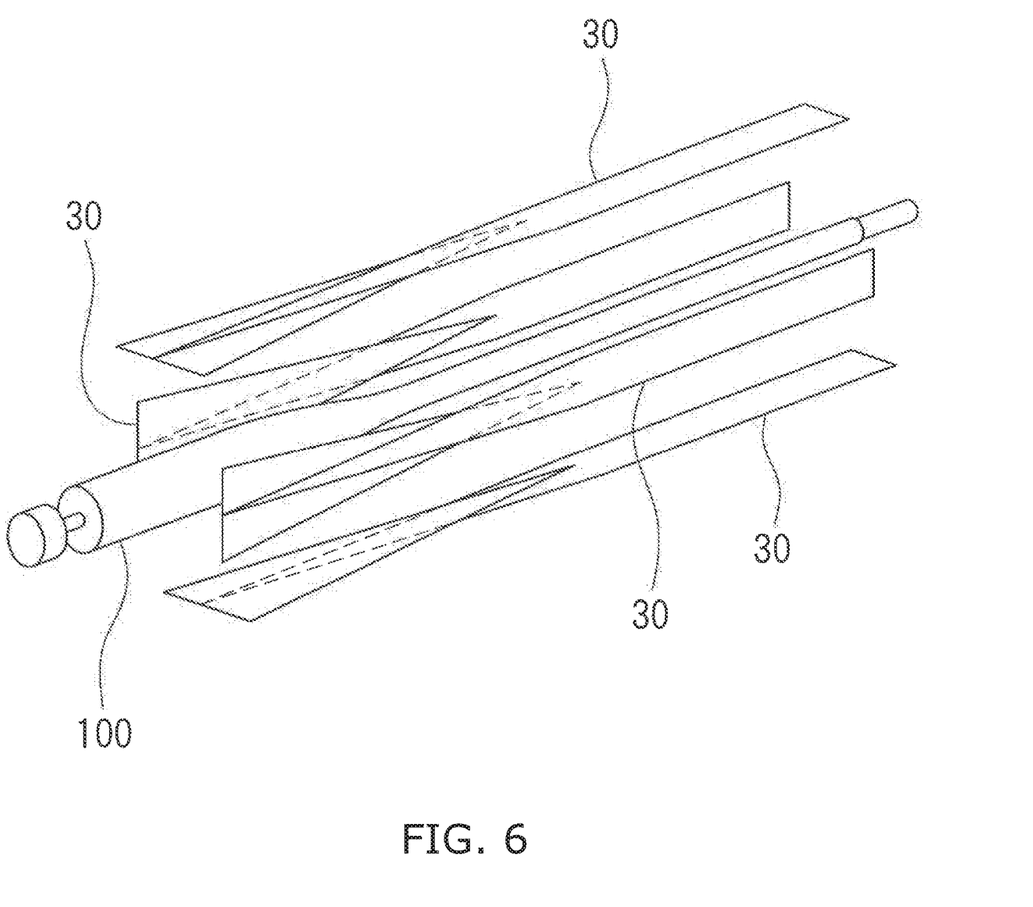
FIG. 6 is a schematic diagram showing the manufacturing process of the rod body.

As shown in FIGS. 4 and 6, the main layer 20 is composed of a plurality of strips 30. The plurality of strips 30 is arranged side by side in the circumferential direction on the rear part 4. The edge parts on both side of the strips 30 that are adjacent with each other in the circumferential direction overlap with each other. The strips 30 extend over the entire length of the rear part 4, thus, as can be understood, the length of the strips 30 correspond to the entire length of the rear part 4. The width of the strips 30 are smaller than the circumference of the rear part 4. It is preferable that each of the plurality of the strips 30 have the same shape, however, the plurality of the strips can have different shapes from each other. The strips 30 are composed of prepreg. That is, in one embodiment, the strips 30 are made of a fiber reinforced resin which contains reinforcing fibers. The reinforcing fibers can be, for example, carbon fibers or glass fibers and carbon fibers are particularly preferable.

In the present embodiment, four pieces of strips 30 can be considered a set. As can be understood, the main layer 20 can be composed of four strips 30, for example, or a total of eight strips 30. It is preferable that the strips 30 in a set of four have the same configuration, however, the configurations can be different from each other. In the present embodiment, the four pieces the strips 30 are in the same configuration with each other.

Figure 5A:
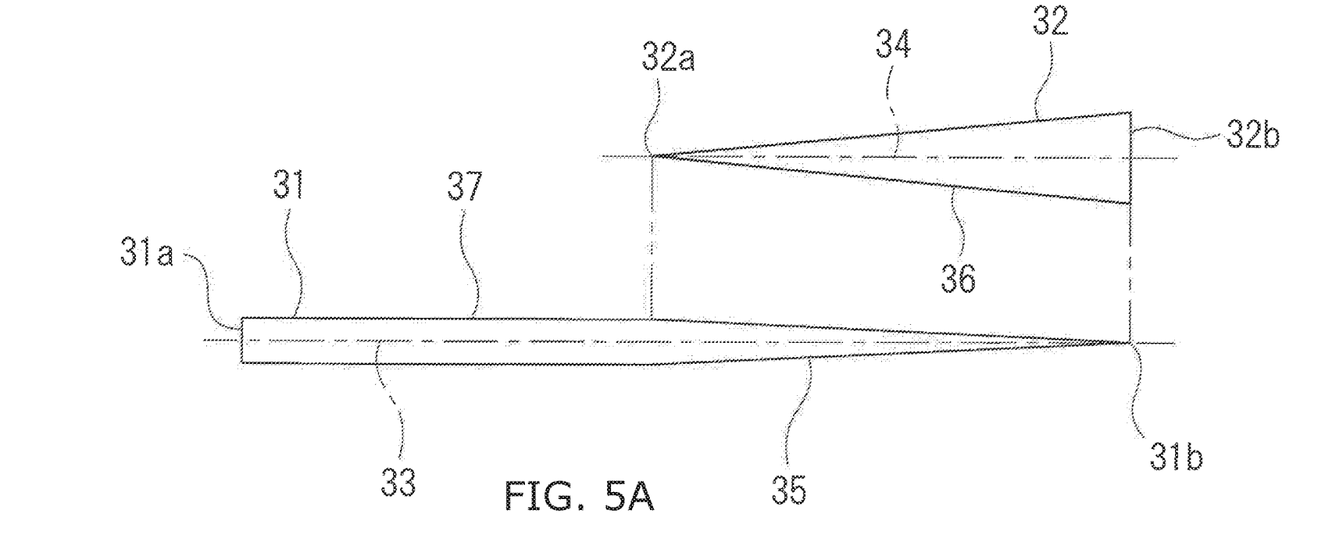
FIGS. 5A and 5B illustrate the manufacturing process of the rod body.
Figure 5B:
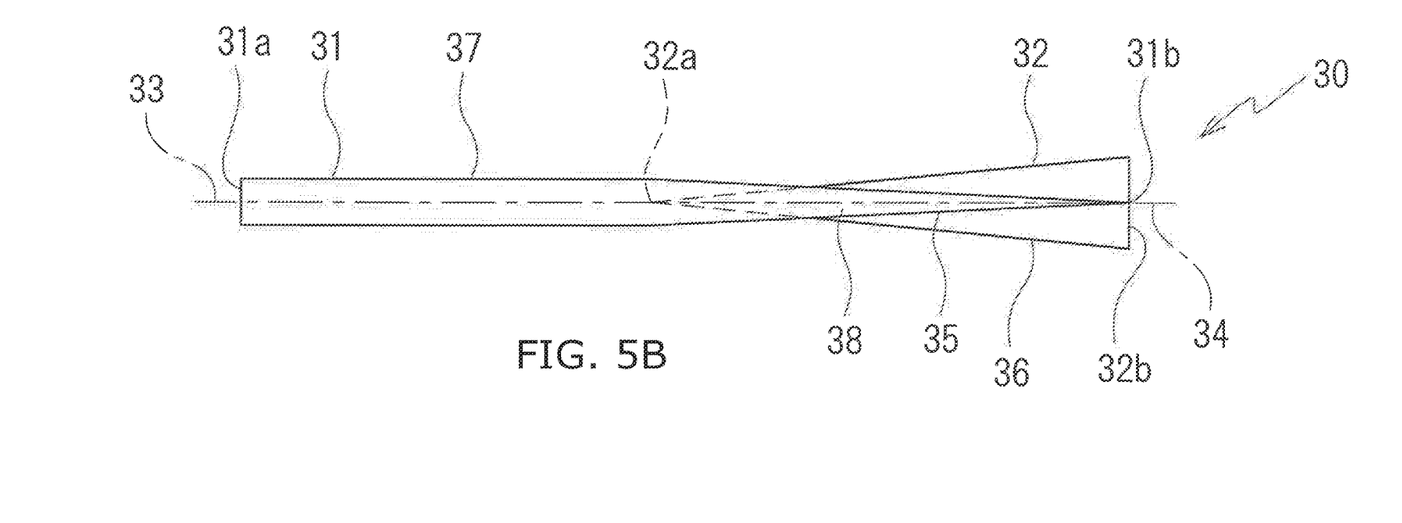

The configuration of a strip 30 will be further described here. In one embodiment, as shown in FIGS. 5A and 5B, the strips 30 are composed of two pieces—a front piece and a rear piece. In particular, the strip 30 can be composed of a front piece 31 (tip strip portion) and a rear piece 32 (end strip portion) which is disposed at the rear side of the front piece 31. A front end 31a of the front piece 31 is disposed on the front end of the strip 30. That is, the front end 31a of the front piece 31 is disposed on the front end of the rear part 4. A rear end 31b of the front piece 31 is disposed at the rear end of the strip 30. That is, the rear end 31b of the front piece 31 is disposed at the rear end of the rear part 4. However, the rear end 31b of the front piece 31 can be disposed forward from the rear end of the rear part 4. The front end 32a of the rear piece 32 is disposed near the central portion of the rear part 4. The rear end 32b of the rear piece 32 is disposed at the rear end of the strip 30. That is, the rear end 32b of the rear piece 32 is disposed at the rear end of the rear part 4.

The shape of the front piece 31 and the shape of the rear piece 32 are different from each other. Both of the shape of the front piece 31 and the shape of the rear piece 32 can vary. It is preferable that the front piece 31 and the rear piece 32 are symmetrical in the width direction. Moreover, it is preferable that the center line 33 of the front piece 31 in the width direction and the center line 34 of the rear piece 32 in the width direction are disposed on the same line in the circumferential direction of the rear part 4. It is preferable that the front piece 31 has a first narrowing section 35 which gradually narrows in width towards the rear side. It is preferable that the rear piece 32 has a second narrowing section 36 which gradually narrows in width towards the front side.

In FIG. 5A, one example of the front piece 31 and the rear piece 32 in a separated state is shown. The front piece 31 has a length which corresponds to the entire length of the strip 30, which as can be understood also corresponds to the entire length of the rear part 4. However, the length of the front piece 31 can be shorter than the entire length of the rear part 4. The front piece 31 has a main portion 37 which has a constant width and a first narrowing section 35 which continues or extends from the rear side of the main portion 37. The main portion 37 is a rectangle, and the length of the main portion 37 is the length of the long side of the rectangle. The width of the main portion 37 is the length of the short side of the rectangle. The width of the main portion 37 is smaller than the circumference of the small diameter part 11 of the rear part 4. In one embodiment the width of the main portion 37 is nearly half of the circumference of the small diameter part 11 of the rear part 4, for example. The first narrowing section 35 is an isosceles triangle with an apex on the rear side. As can be understood, the overall shape of the front piece 31 is a pentagon.

The rear piece 32 itself as a whole is the second narrowing section 36. The rear piece 32 is an isosceles triangle with an apex the front end 32a. The length of the rear piece 32 is the same as the length of the first narrowing section 35 of the front piece 31, for example. However, the length of the rear piece 32 can be longer or shorter than the length of the first narrowing section 35 of the front piece 31. It is preferable that the width of the rear end 32b of the rear piece 32 is larger than the width of the main portion 37 of the front piece 31. The width of the rear end 32b of the rear piece 32 is smaller than the perimeter of the circumference of the large diameter part 13 of the rear part 4. The width of the rear end 32b of the rear piece 32 is nearly half of the circumference of the large diameter part 13, for example.

As shown in FIG. 5B, the front piece 31 and the rear piece 32 partially overlap each other. Either one of the front piece 31 or the rear piece 32 can be on the outside of the other one. In the present embodiment, the front piece 31 is on the outside and the rear piece 32 is on the inside. The center line 33 of the front piece 31 in the width direction and the center line 34 of the rear piece 32 in the width direction are disposed on the same line in the circumferential direction of the rear part 4 in the state in which the front piece 31 and the rear piece 32 overlap. The front end 32a of the rear piece 32 is disposed on or near the boundary between the main portion 37 and the first narrowing section 35 of the front piece 31. The rear end 31b of the front piece 31 approximately coincides with the rear end 32b of the rear piece 32. The first narrowing section 35 of the front piece 31 and the second narrowing section 36 of the rear piece 32 partially overlap. The part where the front piece 31 and the rear piece 32 overlap is called vertically overlapping portion 38. In the present embodiment, the vertically overlapping portion 38 is a diamond shape or a kite shape. In this way, the strip 30 is formed by the front piece 31 and the rear piece 32 partially overlapping. The vertically overlapping portion 38 is disposed at least on the expanding part 12 of the rear part 4. Since the vertically overlapping portion 38 is disposed on the expanding part 12, wrinkles are less prone to be generated.

A first prepreg which forms the front piece 31 and a second prepreg which forms the rear piece 32 can be the same or different from each other. In one embodiment, the types of the reinforcing fiber of the first prepreg and the reinforcing fiber of the second prepreg are different from each other. Even when the types of the reinforcing fiber of the first prepreg and the reinforcing fiber of the second prepreg are the same, the reinforcing fibers with different degree of elasticity can be used, for example. The resin content of the second prepreg can be different from the resin content of the first prepreg. The direction of the reinforcing fiber of the first prepreg and the direction of the reinforcing fiber of the second prepreg can be different. The first prepreg can be two axial prepreg, for example, and the second prepreg can be four axial prepreg, for example. The thickness of the first prepreg and the thickness of the second prepreg can be different. In this manner, by having different specifications on the first prepreg and the second prepreg, the degree of freedom in design for the rear part 4 can be improved.

Figure 7A:
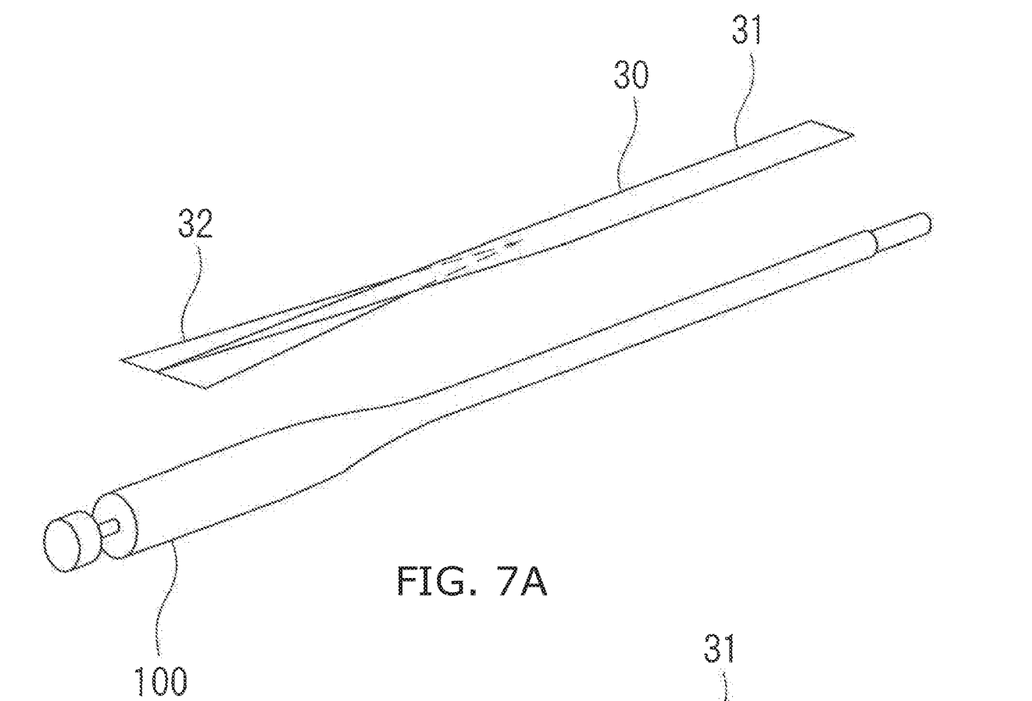
FIG. 7A and FIG. 7B are schematic diagrams showing the manufacturing process of the rod body.
Figure 7B:
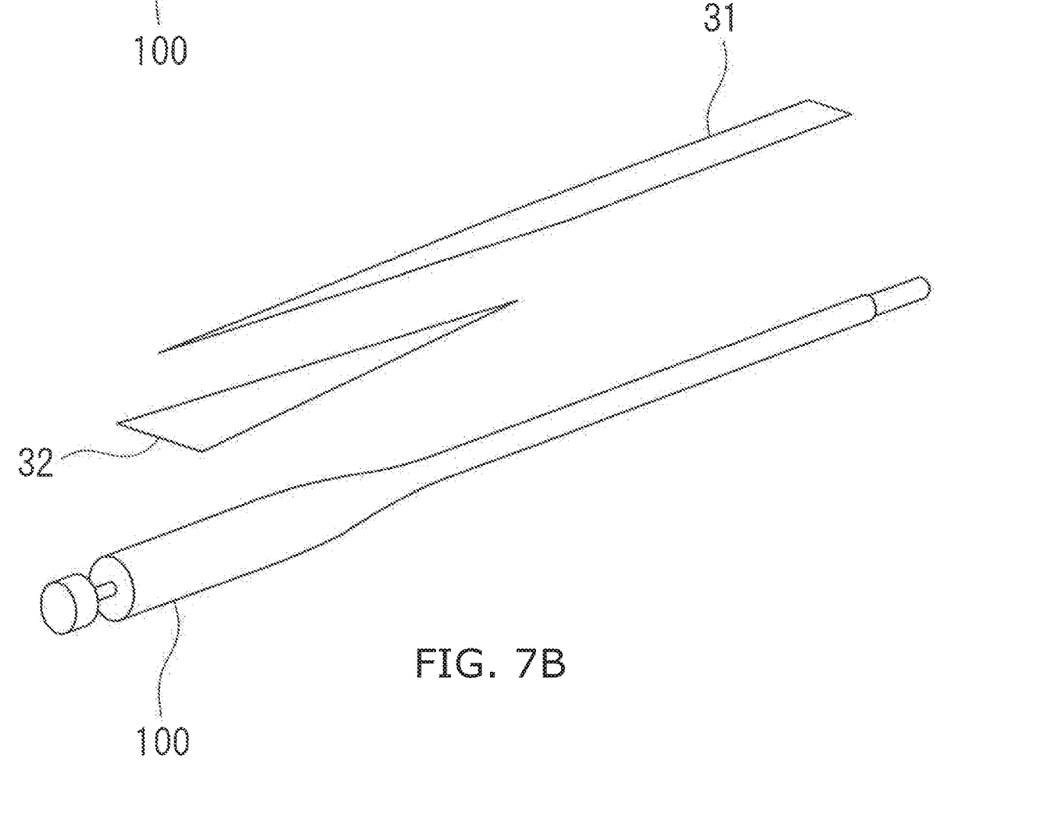

As shown in FIGS. 4 and 6, the rear part 4 is formed by placing the strips 30 on the mandrel 100 and firing. As shown in FIG. 4, the shape of the mandrel 100 corresponds to the shape of the rear part 4. The mandrel 100 has a first region 101 to form the small diameter part 11, a second region 102 to form the steep expanding part 12 and a third region 103 to form the large diameter part 13 sequentially from the front side. When placing the strips 30 on the mandrel 100, the front piece 31 and the rear piece 32 can overlap with each other in advance, and the front piece 31 and the rear piece 32 can be placed on the mandrel 100 together at once, as shown in FIG. 7A. Also, as shown in FIG. 7B, the front piece 31 and the rear piece 32 can be placed on the mandrel 100 separately. In other words, the front piece 31 and the rear piece 32 can be placed on the mandrel 100 in a state in which the front piece 31 and the rear piece 32 are detached. As shown in FIG. 6, four pieces of the strips 30 are placed at intervals of 90° in the circumferential direction of the mandrel 100. The vertically overlapping portions 38 of the strips 30 are disposed at least on the second region 102 of the mandrel 100. The vertically overlapping portions 38 are partially disposed on the first region 101 of the mandrel 100. The vertically overlapping portions 38 are partially disposed on the third region 103 of the mandrel 100. The main layer 20 is formed in this manner.

Sublayer 21

The sublayer 21 is formed on the outside of the main layer 20, and can be formed over the entire length of the rear part 4. The thickness of the sublayer 21 is preferably constant or consistent. In one embodiment, the sublayer 21 is a spiral layer. That is, the sublayer 21 is a long body 22 wound in a spiral. The long body 22 is composed of a tape-shaped prepreg having a consistent width. The sublayer 21 is formed by winding the tape-shaped prepreg in a spiral with a constant pitch. The pitch is, for example, half of the width of the tape-shaped prepreg. The tape-shaped prepreg is wound in a spiral to overlap on the outside of the adjacent tape-shaped prepreg. The tape-shaped prepreg is a prepreg in which reinforcing fibers, such as carbon fibers, continue in the longitudinal direction without getting broken off. The sublayer 21 includes reinforcing fibers along a circumferential direction.

The sublayer 21 is formed by winding the tape-shaped prepreg in a spiral on the outside of the main layer 20 over the entire length of the main layer 20. By winding the tape-shaped prepreg over the entire length of the main layer 20 on an outside thereof, the sublayer 21 can be formed with a uniform thickness. Then, after winding and firing a molding tape (not shown), the molding tape is removed and the mandrel 100 is removed. Then, the end parts are cut and removed, as needed, to form the rear part 4. The rear part 4 formed as described above and the front part 3 are integrally joined to form the rod body 1. The reel seat 2 is attached to the rod body 1 to complete a fishing rod.

The shapes of the first narrowing section 35 and the second narrowing section 36 can vary. For example, the shapes can be a triangle other than an isosceles triangle, a trapezoid, a semi-circle or a semi-elliptical, etc. Additionally, the center line of the front piece 31 and the center line of the rear piece 32 do not have to be disposed on the same line. Furthermore, the front piece 31 can be bilaterally asymmetric and the rear piece 32 can be bilaterally asymmetric.

Figure 8:
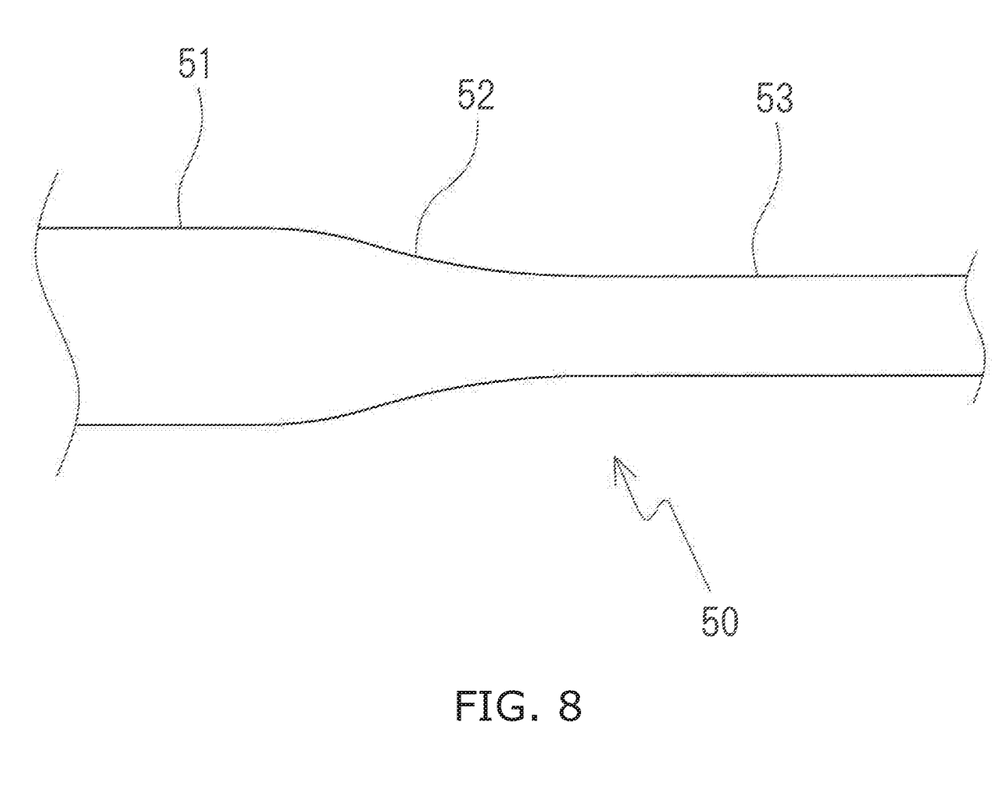
FIG. 8 is a front view showing the main section of a rod body of a fishing rod in another embodiment of the present invention.
Figure 9:
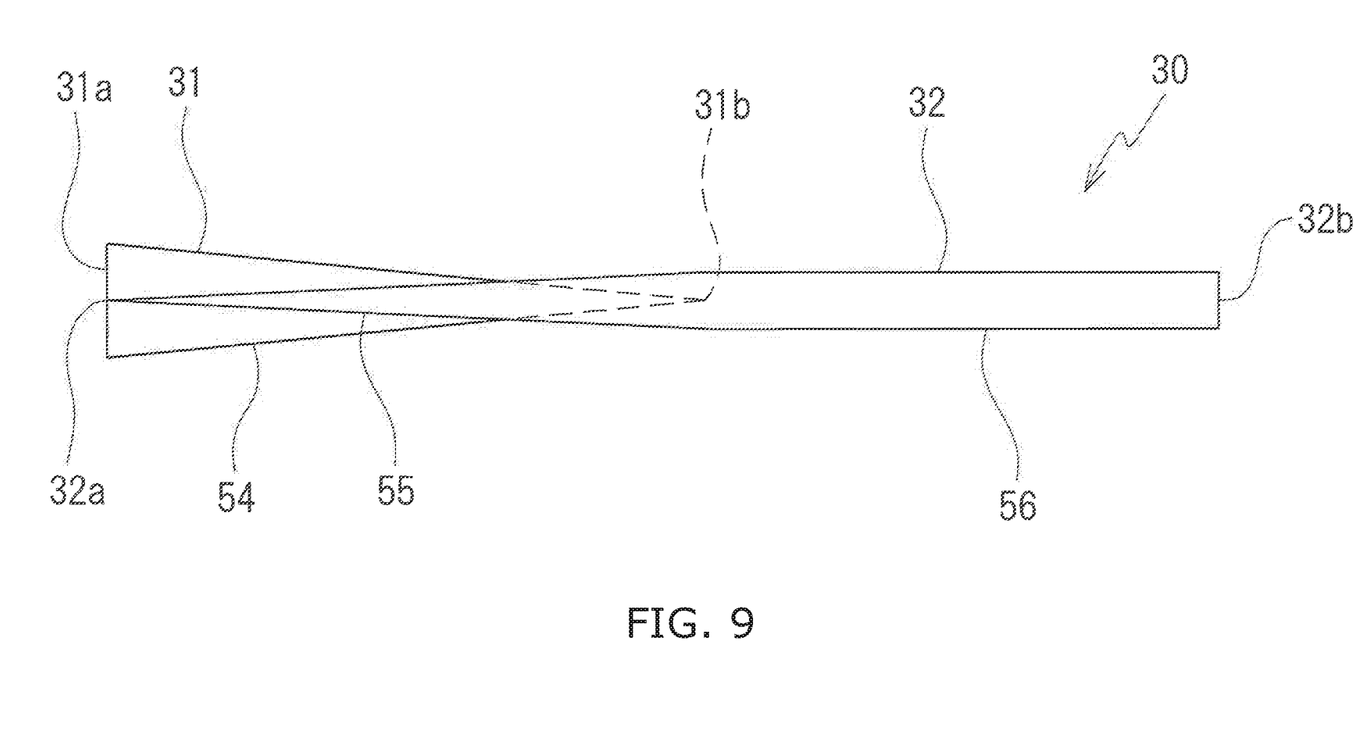
FIG. 9 illustrates the manufacturing process of the rod body.

In the present embodiment, the rear part 4 includes the expanding part 12, however, in another embodiment, as shown in FIG. 8, a rod body 50 can have a diameter-reducing part 52. In this embodiment, the rod body 50 has a large diameter part 51, and the diameter-reducing part 52 continues or extends from the rear side of the large diameter part 51 and a small diameter part 53 continues or extends from the rear side of the diameter-reducing part 52. Both the large diameter part 51 and the small diameter part 53 can have a straight shape with constant inner diameter. However, the large diameter part 51 and the small diameter part 53 can have expanding or increasing diameters towards the rear side with prescribed slopes. Strip 30 of the main layer 20 of rod body 50 can have a configuration that is opposite in the front and rear from the above-mentioned configuration. That is, the strip 30 can be composed of a front piece 31 and a rear piece 32 as shown in FIG. 9, for example. The front piece 31 is an isosceles triangle in which a rear end 31b is the apex and the entire front piece 31 is a first narrowing section 54. The rear piece 32 has a second narrowing section 55 which is an isosceles triangle with the front end 32a being the apex and a rectangular-shaped main portion 56. The front piece 31 and at least the second narrowing section 55 of the rear piece 32 partially overlap. The vertically overlapping portion 38 is disposed at least on the diameter-reducing part 52. Since the vertically overlapping portion 38 is disposed on the diameter-reducing part 52, wrinkles are less prone to be generated.

Figure 10:
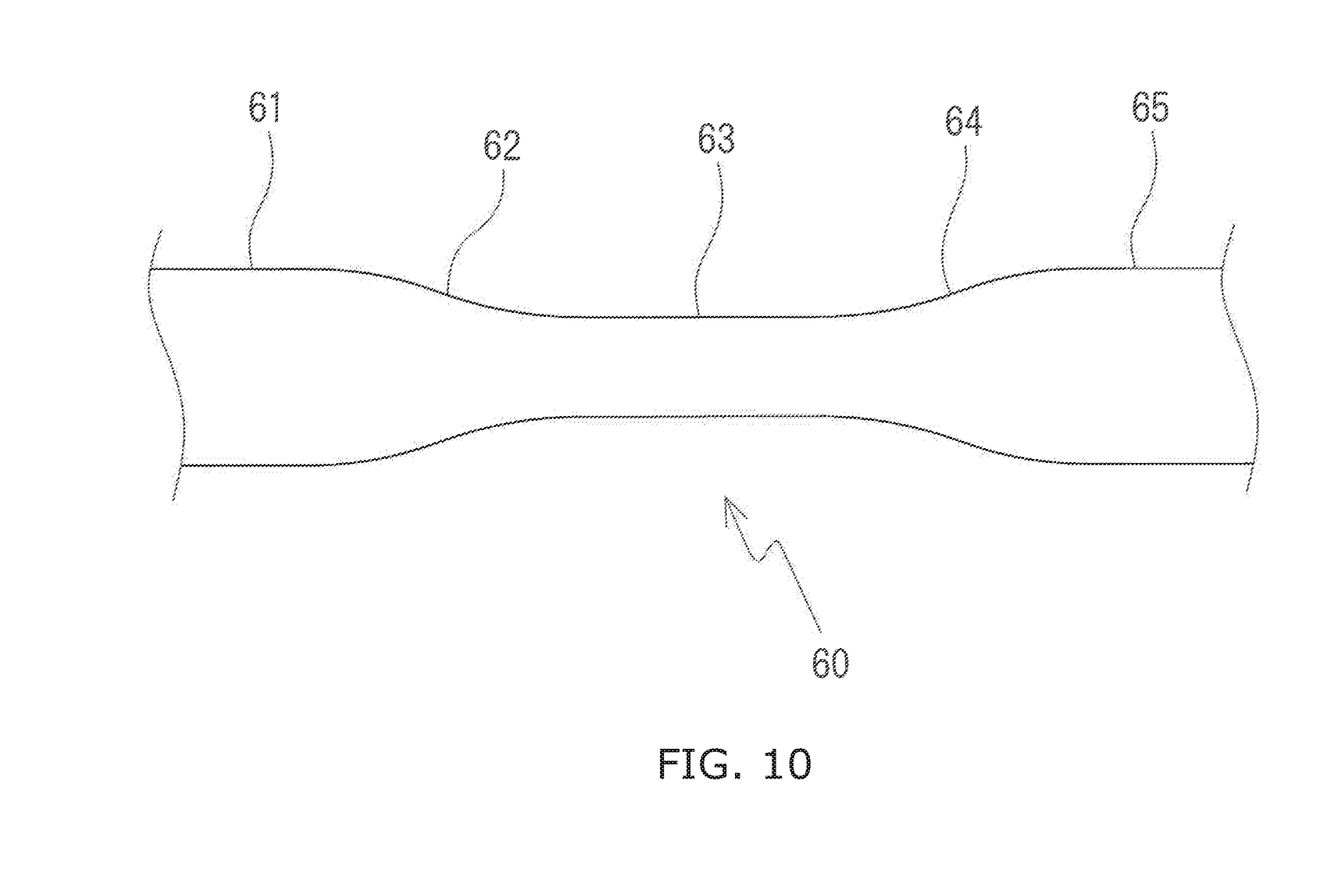
FIG. 10 is a front view showing the main section of a rod body of a fishing rod in another embodiment of the present invention.
Figure 11:
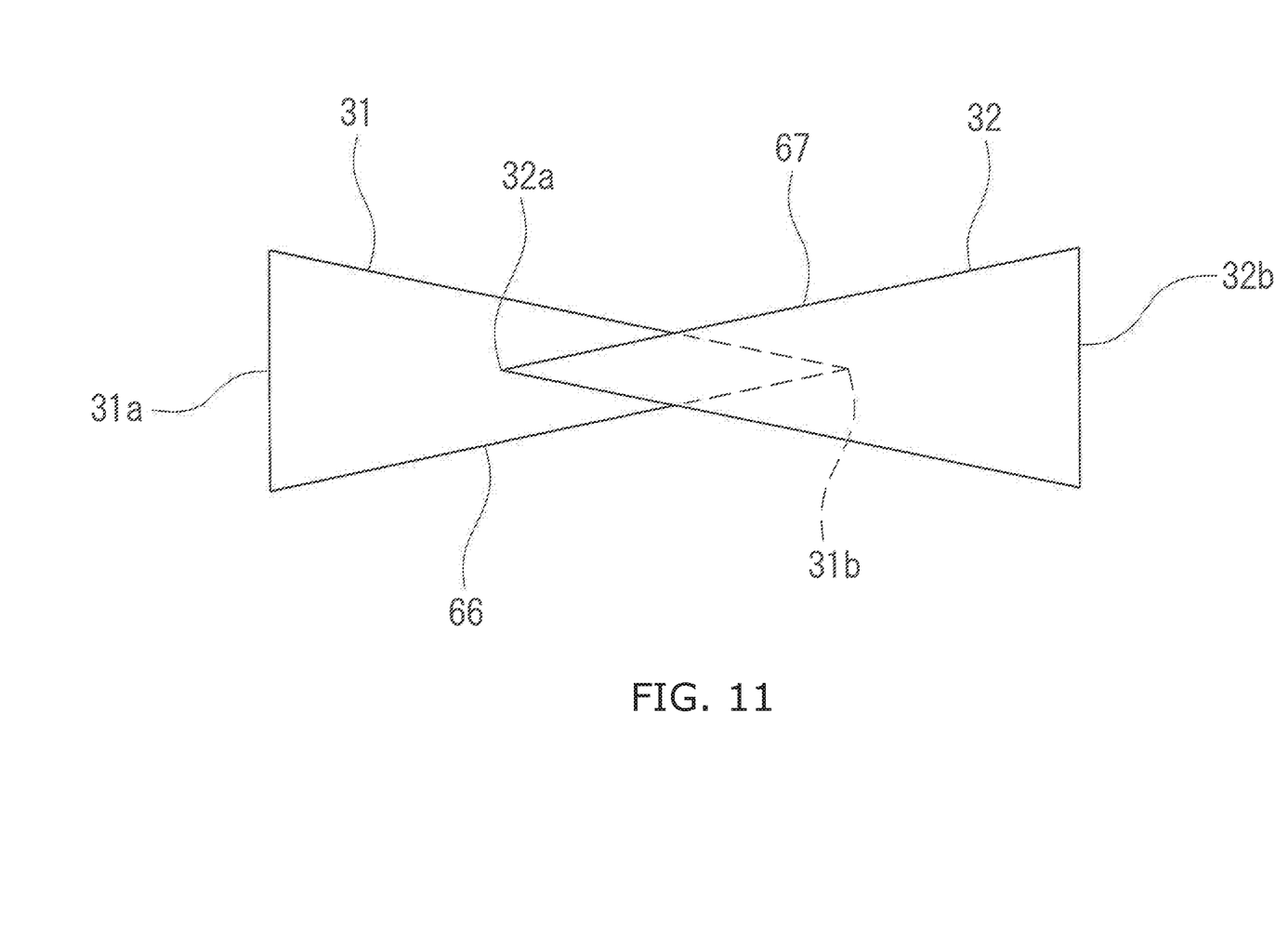
FIG. 11 illustrates the manufacturing process of the rod body.
Figure 12:
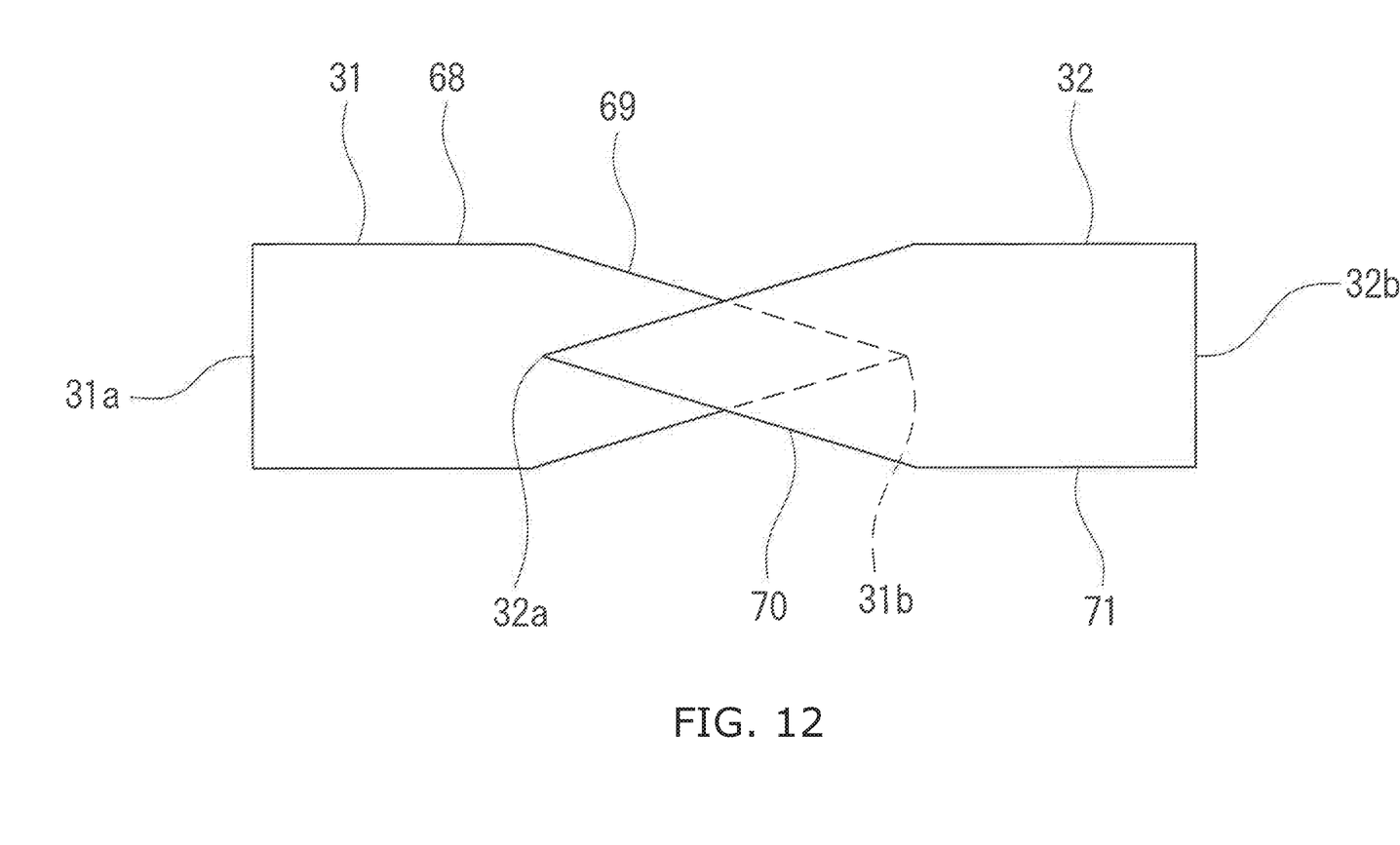
FIG. 12 illustrates the manufacturing process of a rod body of a fishing rod in another embodiment of the present invention.

Additionally, as shown in FIG. 10, a rod body 60 can include a frontward large diameter part 61, a diameter-reducing part 62 which continues or extends from the rear side of the frontward large diameter part 61, a small diameter part 63 which continues or extends from the rear side of the diameter-reducing part 62, a expanding part 64 (expanding part) which continues or extends from the rear side of the small diameter part 63 and a rearward large diameter part 65 which continues or extends from the rear side of the expanding part 64. In this embodiment, the frontward large diameter part 61, the small diameter part 63 and the rearward large diameter part 65 can be straight, respectively. Also, the frontward large diameter part 61, the small diameter part 63 and the rearward large diameter part 65 can have a shape which increases in diameter towards the rear side with a prescribed slope. Strip 30 of a main layer 20 of this type of rod body 60 can include a front piece 31 and a rear piece 32, as shown in FIG. 11, for example. That is, the front piece 31 is an isosceles triangle in which a rear end 31b is the apex and the entire front piece 31 is a first narrowing section 66. The rear piece 32 can be longitudinally symmetrical with the front piece 31. The rear piece 32 is an isosceles triangle in which a front end 32a is the apex and the entire rear piece 32 is a second narrowing section 67. The front piece 31 and the rear piece 32 partially overlap. The vertically overlapping portion 38 is disposed at least on the region starting from the diameter-reducing part 62 through the small diameter part 63 to the expanding part 64. The strips 30 also can be configured as shown in FIG. 12. That is, the front piece 31 can have a main portion 68 which is rectangle or square and a first narrowing section 69 that is an isosceles triangle in which the apex is the rear end portion. The rear piece 32 can be longitudinally symmetrical with the front piece 31. The rear piece 32 has a second narrowing section 70 that is an isosceles triangle in which the apex is the front end and a main portion 71 which is rectangle or square. In this embodiment, the first narrowing section 69 of the front piece 31 and the second narrowing section 70 of the rear piece 32 partially overlap, for example. The vertically overlapping portion 38 is disposed at least on the region starting from the diameter-reducing part 62 through the small diameter part 63 to reach the steep expanding part 64. Since the vertically overlapping portion 38 is disposed on the region starting from the diameter-reducing part 62 through the small diameter part 63 to reach the steep expanding part 64, wrinkles are less prone to be generated.

What is claimed is:

1. A fishing rod, comprising:
a rod body, including a plurality of rod tip strip portions, each of the plurality of rod tip strip portions having a first narrowing section which gradually narrows in width towards a rod end to form a rear end of each of the plurality of rod tip strip portions and a rod end strip portion having a second narrowing width section which gradually narrows in width towards a rod tip to form a front end of the rod end strip portion,
wherein at least a part of the first narrowing section and at least a part of the second narrowing section overlap with each other to form an overlapping portion with the rear end and the front end being positioned along a center line of at least one of each of the plurality of rod tip strip portions or the rod end strip portion,
wherein the center line is a first center line of each of the plurality of rod tip strip portions and the rod end strip portion includes a second center line, the rear end of each of the plurality of rod tip strip portions terminates along the first center line and the front end of each of the plurality of rod end strip portions terminates along the second center line, and the first and second center lines are collinear when the at least a part of the first narrowing section and the at least a part of the second narrowing section overlap with each other to form the overlapping portion.

2. The fishing rod according to claim 1, wherein the width of each of the plurality of rod tip strip portions is narrower than the width of the end strip portion.

3. The fishing rod according to claim 2, wherein each of the plurality of rod tip strip portions includes a small diameter part, the rod end strip portion includes a large diameter part, and the overlapping portion includes an expanding part.

4. The fishing rod according to claim 1, wherein each of the plurality of rod tip strip portions includes a first prepreg and the rod end strip portion includes a second prepreg which is different from the first prepreg.

5. The fishing rod according to claim 1, wherein one of the plurality of rod tip strip portions and the rod end strip portion are symmetrical in a width direction, and a center line of one of the tip strip portions in the width direction and a center line of the rod end strip portion in the width direction are disposed on a same line in a circumferential direction of the rod body.

* * * * *